US007805999B2

(12) United States Patent
Waid et al.

(10) Patent No.: US 7,805,999 B2
(45) Date of Patent: Oct. 5, 2010

(54) APPARATUS AND METHODS FOR MEASURING PRESSURE USING A FORMATION TESTER

(75) Inventors: Margaret Cowsar Waid, Medicine Park, OK (US); Bryan William Kasperski, Azle, TX (US); Dennis Eugene Roessler, Houston, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 0 days.

(21) Appl. No.: 11/855,577

(22) Filed: Sep. 14, 2007

(65) Prior Publication Data

US 2009/0071240 A1    Mar. 19, 2009

(51) Int. Cl.
*G01L 7/00*    (2006.01)
(52) U.S. Cl. .......................................... 73/700; 73/756
(58) Field of Classification Search ............ 73/700–756
See application file for complete search history.

(56) References Cited

U.S. PATENT DOCUMENTS

| | | | | |
|---|---|---|---|---|
| 2,223,786 | A | * | 12/1940 | Helmut ........................ 73/300 |
| 4,596,139 | A | * | 6/1986 | Gournay .................. 73/152.05 |
| 5,337,821 | A | | 8/1994 | Peterson |
| 5,457,988 | A | * | 10/1995 | Delatorre ................. 73/152.51 |
| 5,796,007 | A | * | 8/1998 | Panagotopulos et al. ...... 73/716 |
| 6,246,048 | B1 | * | 6/2001 | Ramos et al. .......... 250/227.18 |
| 6,301,959 | B1 | | 10/2001 | Hrametz |
| 6,663,352 | B2 | * | 12/2003 | Sabini et al. .................. 417/63 |

FOREIGN PATENT DOCUMENTS

SU    953195    8/1982

OTHER PUBLICATIONS

U.S. Appl. No. 11/626,461, filed Jan. 24, 2007, Kasperski.
Rourke, Marvin, et al. "A New Hostile Environment Wireline Formation Testing Tool: A Case Study From the Gulf of Thailand" SPWLA 47th Annual Logging Symposium, Jun. 4-7, 2006, pp. 1-14.
Combined Search and Examination Report from GB patent application No. 0812710.2, dated Oct. 1, 2008.

* cited by examiner

*Primary Examiner*—Lisa M Caputo
*Assistant Examiner*—Jermaine Jenkins
(74) *Attorney, Agent, or Firm*—Wong, Cabello, Lutsch, Rutherford & Brucculeri, L.L.P.

(57) ABSTRACT

A system for measuring pressure in a well borehole using two pressure sensing gauges that are exposed to an area of common pressure. Pressure measurements are made with preferably two pressure gauge assemblies each containing a single pressure sensing gauge. The two pressure gauge assemblies are removably disposed within a receptacle or "pocket" in the outer surface of a wall of a formation tester tool section. When disposed or "side loaded" in the pocket, the gauges within the pair of assemblies are axially aligned and positioned in a plane that is normal to the radius of the formation tester tool section. Both pressure sensing gauges can be connected to respond to the same fluid pressure originating from a probe or port section of a formation tester tool. By disposing the pressure gauge assemblies in a receptacle or "pocket" in the outer surface or wall of a formation tester tool section, the pressure sensing gauges are exposed to wellbore fluids. Pressure sensing gauges are selected to have low mass. The low mass of the gauges and a cooperating heater assembly allow the pressure gauges to rapidly thermally stabilize with changing temperatures in the wellbore.

11 Claims, 3 Drawing Sheets

APPARATUS AND METHODS FOR MEASURING PRESSURE USING A FORMATION TESTER

FIELD OF THE INVENTION

This invention is related to borehole formation testing. More particularly, the invention is related to the measure of fluid pressure at one or more locations within the borehole environs using a formation tester tool with dual axially aligned pressure gauges with parallel major axes disposed in one or more pressure gauge assemblies.

BACKGROUND

A variety of systems are used in borehole geophysical exploration and production operations to determine chemical and physical parameters of materials in the borehole environs. The borehole environs include materials, such as fluids or formation matrix, in the vicinity of a borehole as well as materials, such as fluids, within the borehole. The various systems include, but are not limited to, formation testers and borehole fluid analysis systems conveyed within the borehole. In all of these systems, it is preferred to make all measurements in real-time and within instrumentation in the borehole. However, methods that collect data and fluids for later retrieval and processing are not precluded.

Formation tester systems are used in the oil and gas industry primarily to measure pressure and other reservoir parameters of a formation penetrated by a borehole, and to collect and analyze fluids from the borehole environs to determine major constituents within the fluid. Formation testing systems are also used to measure pressure and other parameters of fluid within the borehole. These parametric measurements are typically combined with in situ or uphole analyses of physical and chemical properties of the formation fluid to evaluate production prospects of reservoirs penetrated by the borehole. By definition, formation fluid refers to any and all fluid including any mixture of fluids.

Regarding formation fluid sampling, it is of prime importance that fluid collected for analysis represents virgin formation fluid with little contamination from fluids used in the borehole drilling operation. Various techniques have been used to minimize sample contamination including the monitoring of fluid pumped through a borehole instrument or borehole "tool" of the formation tester system until one and/or more fluid properties, such as resistivity, cease to change as a function of time. Other techniques use multiple fluid input ports combined with borehole isolation elements such as packers and pad probes to minimize fluid contamination. Regardless of the fluid sampling methodology, accurate and precise measurements of fluid pressure are required to obtain meaningful reservoir production information.

Formation tester tools can be conveyed along the borehole by a variety of means including, but not limited too, a single or multi-conductor wireline, a "slick" line, a drill string, a permanent completion string, or a string of coiled tubing. Formation tester tools may be designed for wireline usage or as part of a drill string. Tool response data and information as well as tool operational data can be transferred to and from the surface of the earth using wireline, coiled tubing and drill string telemetry systems. Alternately, tool response data and information can be stored in memory within the tool for subsequent retrieval at the surface of the earth.

Various methods are used to draw fluid into the formation tester tool for pressure measurements, analysis, sampling, and optionally for subsequent exhausting the fluid into the borehole. One method employs a radially extendable sampling pad that is pressed against the wall of the borehole. A probe port or "snorkel" may or may not be extended from the center of the pad through any borehole mudcake to make contact with formation material. Fluid is drawn into the formation tester tool via a flow line cooperating with the snorkel. Formation pressure is determined from a measure of fluid pressure within the probe flow line. In order to isolate this fluid flow into the probe from fluid flow from the borehole or from the contaminated zone, fluid can be drawn into a guard ring surrounding the snorkel. A more detailed description of the probe and guard ring methodology is presented in U.S. Pat. No. 6,301,959 B1, which is here entered into this disclosure by reference. Using a second method, the formation is isolated from the borehole by one or more packers controlled by the packer section of the formation tester tool. A plurality of packers can be configured axially as "straddle" packers. Fluid is drawn into the formation tester tool via a port flow line cooperating with one or more ports disposed in the wall of the tool between the two straddle packers. Formation pressure is determined from a measure of fluid pressure within the port flow line. Straddle packers and their use are disclosed in U.S. Pat. No. 5,337,821, which is incorporated into this disclosure by reference.

SUMMARY OF THE INVENTION

This disclosure is directed toward a pressure gauge assembly comprising two pressure sensing gauges (or simply "pressure gauges" or "gauges") that are exposed to an area of common pressure. Stated another way, the two pressure gauges are configured to be exposed to and respond simultaneously to the same fluid sample. Preferably a plurality of pressure gauge assemblies is disposed in a formation tester tool to yield fluid pressure measurements at various locations within the borehole environs. As a first example, a pressure gauge assembly can be hydraulically coupled to a probe flow line to measure formation pressure at the probe. As a second example, a pressure gauge assembly can be hydraulically coupled to a port flow line to measure borehole fluid pressure isolated by a straddle packer.

Pressure measurements are made with one or more pressure gauge assemblies. A pressure gauge assembly preferably comprises one pressure sensing gauge, and two pressure gauge assemblies are disposed so that pressure gauges are axially aligned and both responsive to a pressure being measured. Alternately, two pressure gauges can be disposed and axially aligned within a single pressure gauge assembly. Using either assembly embodiment, the gauges are electronically connected to an assembly electrical connector disposed at one end of the pressure gauge assembly. The gauges are hydraulically coupled to assembly hydraulic connectors at the opposite end of the pressure gauge assembly. The assembly hydraulic connectors are inserted in the tool body such that both gauges are exposed to the same hydraulic pressure.

The preferably two pressure gauge assemblies are removably disposed within a receptacle or "pocket" in the outer surface of a wall of a formation tester tool section. When disposed or "side loaded" in the pockets the gauges within the pair of assemblies are axially aligned and positioned in a plane that is normal to the radius of the formation tester tool section. Furthemore, the assembly electronic connector operationally connects to a tool electrical connector thereby establishing electronic connection between the gauges and an electronic section of the formation tester tool. In addition, the assembly hydraulic connector operationally connects to a pressure flow line in the tool body thereby establishing pressure coupling between the two pressure gauges and a port or probe section of the formation tester tool, or to the one or more flowbusses in the tool. Furthermore, both pressure gauges can be connected to respond to the same fluid pressure originating from the probe or port section. This provides a redundant pressure measurement with advantages to be discussed in subsequent sections of this disclosure.

By installing the pressure gauge assembly in a receptacle or "pocket" in the outer surface or wall of a formation tester tool section, the pressure sensing gauges are exposed to wellbore fluids. Pressure gauges are selected to have low mass. The low mass of the gauges and a cooperating heater assembly allow the pressure gauges to rapidly thermally stabilize with changing temperatures in the well borehole. Changing temperatures, both heating and cooling, are encountered as the tool is conveyed up and down the borehole.

The axial alignment or "side-by-side" gauge geometry reduces the shut in fluid volumes when compared with an "end-to-end" gauge geometry. In addition, the shut in fluid volume is equal for both gauges and both gauges are exposed to identical fluid. The axial alignment or side by side geometry has the added benefit of exposing the pressure gauges to the exact same pressure with no change due to the hydrostatic difference that is observed with an axially spaced or "end-to-end" gauge geometry.

Within the tool body, hydraulic fluid can be circulated through the heater assembly that contacts the pressure gauge assemblies. The heater assembly disposed in the tool body heats the pressure gauges thereby rapidly raising the temperature of the pressure gauge assemblies. In the embodiment discussed in detail in this disclosure, the heater element is hydraulic but an electric heater element is not precluded. This heater assembly methodology rapidly elevates both gauges to temperatures in a range normally encountered in a borehole environment thereby avoiding excessive time for the pressure gauge assembly to reach thermal equilibrium with the borehole environs. The low mass of the assembly allows rapid response to changes in temperature, both heating and cooling, as the tool is moved up and down the borehole.

The dual pressure gauges provide redundant pressure measurements from a common pressure area. A divergence in the two pressure measurements indicates that at least one pressure gauge is malfunctioning. The pressure response from the working gauge can be used to determine fluid pressure thereby avoiding aborting a formation testing operation.

The side loading feature of the pressure gauge assembly allows the assembly to be changed quickly with minimal operation down time. Since assemblies can be easily changed, they can be calibrated off site and inserted into the formation tester tool immediately prior to testing operations. Furthermore, the same pressure gauge assembly can be disposed sequentially in a plurality of tester tools thereby minimizing systematic error in multiple run or multiple well testing operations.

The formation tester tool is conveyed within a well borehole by a conveyance apparatus cooperating with a connecting structure. The conveyance apparatus is disposed at the surface of the earth. The connecting structure that operationally connects the formation tester tool to the conveyance apparatus is a tubular or a wireline cable. The connecting structure can serve as a data conduit between the tool and the conveyance apparatus. The conveyance apparatus is operationally connected to surface equipment, which provides a variety of functions including processing tool response data, controlling operation of the tool, recording measurements made by the tool, tracking the position of the tool within the borehole, and the like. Measurements can be made in real-time and at a plurality of axial positions or "depths" during a single trip of the tool in the borehole. Furthermore, a plurality of measurements can be made at a single depth during a single trip of the tool in the borehole.

The formation tester tool, in the disclosed embodiment, comprises a plurality of operationally connected tool sections such as, but not limited to, a packer section, a probe or port section, a sample carrier section, a pump section, a hydraulics section, an electronics section, and a telemetry section. Preferably each tool section is controlled locally and can be operated independently of the other sections. Both the local control and the independent operation are accomplished by a section processor disposed within each tool section. Fluid flows to and from elements within a tool section are preferably controlled by the section processor. At least one fluid flowbus and at least one hydraulic fluid flowbus preferably extend contiguously through the packer, probe or port tool, sample carrier, and pump sections of the tool. Functions of the tool sections will be discussed in detail in subsequent sections of this disclosure.

Fluid is preferably drawn into the tool through one or more probe or port sections using one or more pumps. Each tool section can comprise one or more intake or exhaust ports. Each intake port or exhaust can optionally be configured as a probe, guard, or borehole fluid intake port. As discussed above, borehole fluid contamination is minimized using one or more ports cooperating with borehole isolation elements such as a pad type device that is urged against the wall of the formation, or one or more packers.

BRIEF DESCRIPTION OF THE DRAWINGS

The manner in which the above recited features and advantages, briefly summarized above, are obtained can be understood in detail by reference to the embodiments illustrated in the appended drawings.

DETAILED DESCRIPTION OF THE PREFERRED EMBODIMENTS

Basic principles of the pressure gauge assembly are disclosed in detail using an exemplary system embodied as a formation tester tool comprising a plurality of formation tester tool sections.

Figure 1:
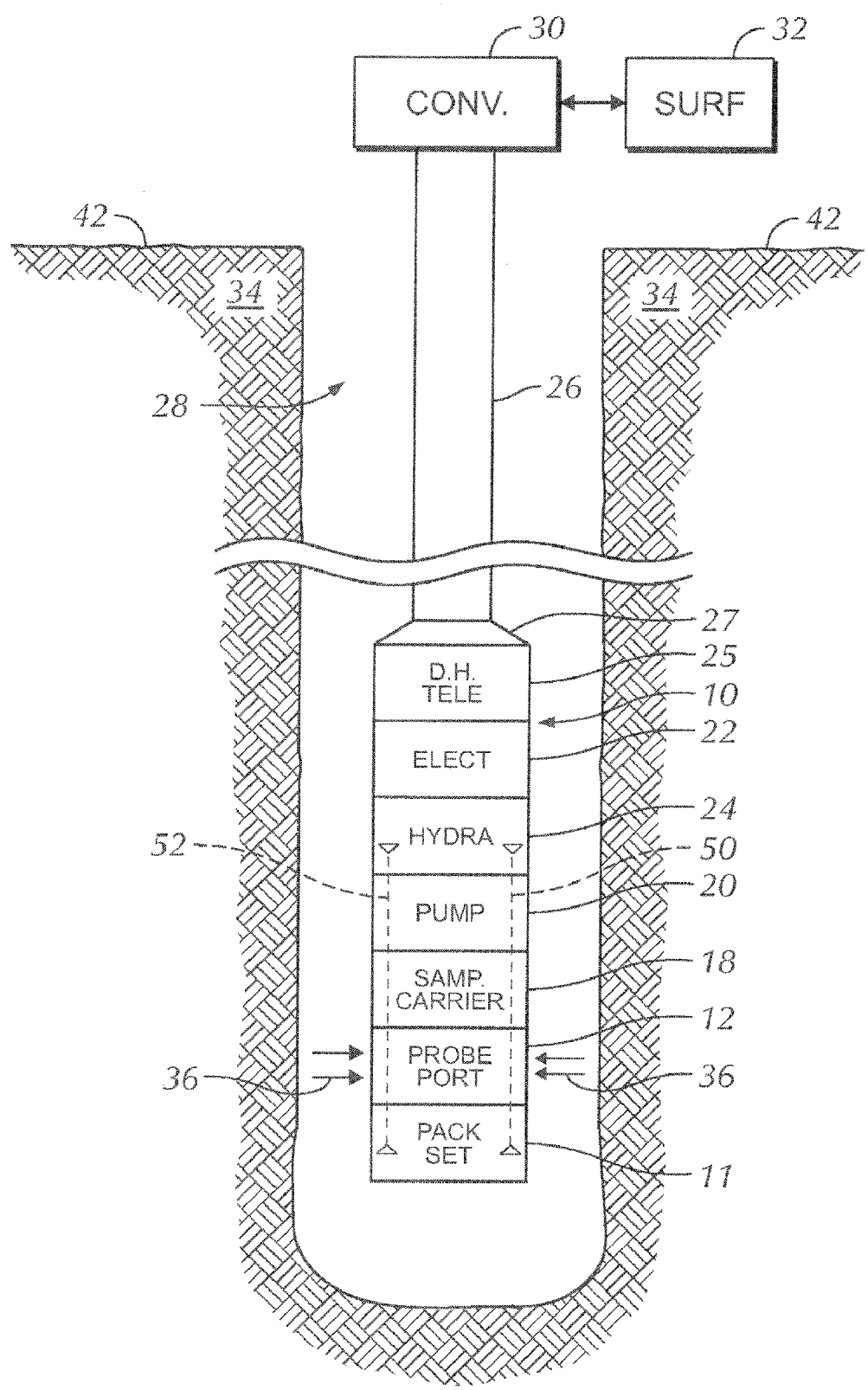
FIG. 1 illustrates conceptually the major elements of one embodiment of a formation tester system operating in a well borehole.

The formation tester tool is conveyed within a well borehole by any suitable conveyance apparatus. FIG. 1 illustrates conceptually the major elements of an embodiment of a formation tester system operating in a well borehole 28 that penetrates earth formation 34. The embodiment of FIG. 1 is preferably an exemplary embodiment of a more general downhole formation tester device using pressure measurements at one or more locations in the formation, in the borehole, or even at locations within the formation tester device.

The formation tester tool is denoted as a whole by the numeral 10. The tool 10 comprises a plurality of operationally connected sections including a packer section 11, a probe or port section 12, a sample carrier section 18, a pump section 20, a hydraulics section 24, an electronics section 22, and a downhole telemetry section 25. One or more fluid flowbusses, illustrated conceptually with a broken line 50, extend contiguously through the packer, probe or port tool, sample carrier, and pump sections 11, 12, 18 and 20, respectively.

Again referring to FIG. 1, fluid is drawn into the formation tester tool 10 through a probe or port tool section 12. The probe or port section can comprise a snorkel and/or one or more intake ports, which are shown in subsequent illustrations. Fluid flow into the probe or port section 12 is illustrated conceptually with the arrows 36. During the borehole drilling operation, the fluid within near borehole formation can be contaminated with drilling fluid typically comprising solids, fluids, and other materials. Drilling fluid contamination of fluid drawn from the formation 34 is typically minimized using one or more probes cooperating with a borehole isolation element such as a pad type device comprising a probe and a guard, as disclosed in previously referenced U.S. Pat. No. 6,301,959 B1. One or more probes extend from the pad onto the formation 34. Alternately, the formation can be isolated from the borehole by one or more packers controlled by the packer section 11. A plurality of packers can be configured axially as "straddle" packers. Straddle packers and their use are disclosed in previously referenced U.S. Pat. No. 5,337,821.

With the sections of the tool 10 configured in FIG. 1, fluid passes from the probe or port section 12 through a fluid flow line to one or more fluid flowbusses 50 under the action of the pump section 20. A pressure gauge assembly can be disposed essentially anywhere along the flow line or one or more fluid flowbusses 50 to obtain pressure measurements, as will be illustrated subsequently with specific examples. The fluid flow line is preferably short, valved, and is attached to the fluid flowbus. The pressure sensing gauges are normally operationally connected to this short flow line, as will be discussed and illustrated subsequently.

In addition, fluid samples can be retained within one or more sample containers within the sample carrier section 18 for return to the surface 42 of the earth for additional analysis. The surface 42 is typically the surface of earth formation or the surface of any water covering the earth formation.

The hydraulic section 24 depicted in FIG. 1 provides hydraulic power for operating numerous valves and other elements within the tool 10 to control both formation and hydraulic fluid flows. Examples of valving schemes are illustrated in U.S. patent application Ser. No. 11/626,461 filed on Jan. 24, 2007 which is assigned to the assignee of this disclosure and is herein entered into this disclosure by reference.

The Electronics section 22 shown in FIG. 1 comprises necessary tool control to operate elements of the tool 10 including one or more pressure gauge assemblies, motor control to operate motor elements in the tool, power supplies for the various section electronic elements of the tool, power electronics, an optional telemetry for communication over a wireline to the surface, an optional memory for data storage downhole, and a processor for control, measurement, and communication to and from the motor control and other tool sections. Preferably the individual tool sections optionally contain electronics (not shown) for section control and measurement.

Still referring to FIG. 1, the tool 10 can have an optional additional downhole telemetry section 25 for transmitting various data measured within the tool 10 and for receiving commands from surface 42 of the earth. The downhole telemetry section 26 can also receive commands transmitted from the surface of the earth. The upper end of the tool 10 is terminated by a connector 27. The tool 10 is operationally connected to a conveyance apparatus 30 disposed at the surface 42 by means of a connecting structure 26 that is a tubular or a cable. More specifically, the lower or "borehole" end of the connecting structure 26 is operationally connected to the tool 10 through the connector 24. The upper or "surface" end of the connecting structure 26 is operationally connected to the conveyance apparatus 30. The connecting structure 26 can function as a data conduit between the tool 10 and equipment disposed at the surface 42. If the tool 10 is a logging tool element of a wireline formation tester system, the connecting structure 26 represents a preferably multi-conductor wireline logging cable and the conveyance apparatus 30 is a wireline draw works assembly comprising a winch. If the tool 10 is a component of a measurement-while-drilling or logging-while-drilling system, the connecting structure 26 is a drill string and the conveyance apparatus 30 is a rotary drilling rig. If the tool 10 is an element of a coiled tubing logging system, the connecting structure 26 is coiled tubing and the conveyance apparatus 30 is a coiled tubing injector. If the tool 10 is an element of a drill string tester system, the connecting structure 26 is again a drill string and the conveyance apparatus 30 is again a rotary drilling rig.

Again referring to FIG. 1, surface equipment 32 is operationally connected to the tool 10 through the conveyance apparatus 30 and the connecting structure 26. The surface equipment 32 comprises a surface telemetry element (not shown), which communicates with the downhole telemetry section 25. The connecting structure 26 functions as a data conduit between the downhole and surface telemetry elements. The surface unit 32 preferably comprises a surface processor that optionally performs additional processing of data measured by sensors and gauges in the tool 10. The surface processor also cooperates with a depth measure device (not shown) to track data measured by the tool 10 as a function of depth within the borehole at which it is measured. The surface equipment 32 preferably comprises recording means for recording "logs" of one or more parameters of interest as a function of time and/or depth.

It is noted that FIG. 1 illustrates one embodiment of the formation tester tool 10, and this embodiment is used to disclose basic concepts of the pressure gauge assemblies used in the system. It should be understood, however, that the various sections can be arranged in different axial configurations, and multiple sections of the same type can be added or removed as required for specific borehole operations.

Figure 2A:
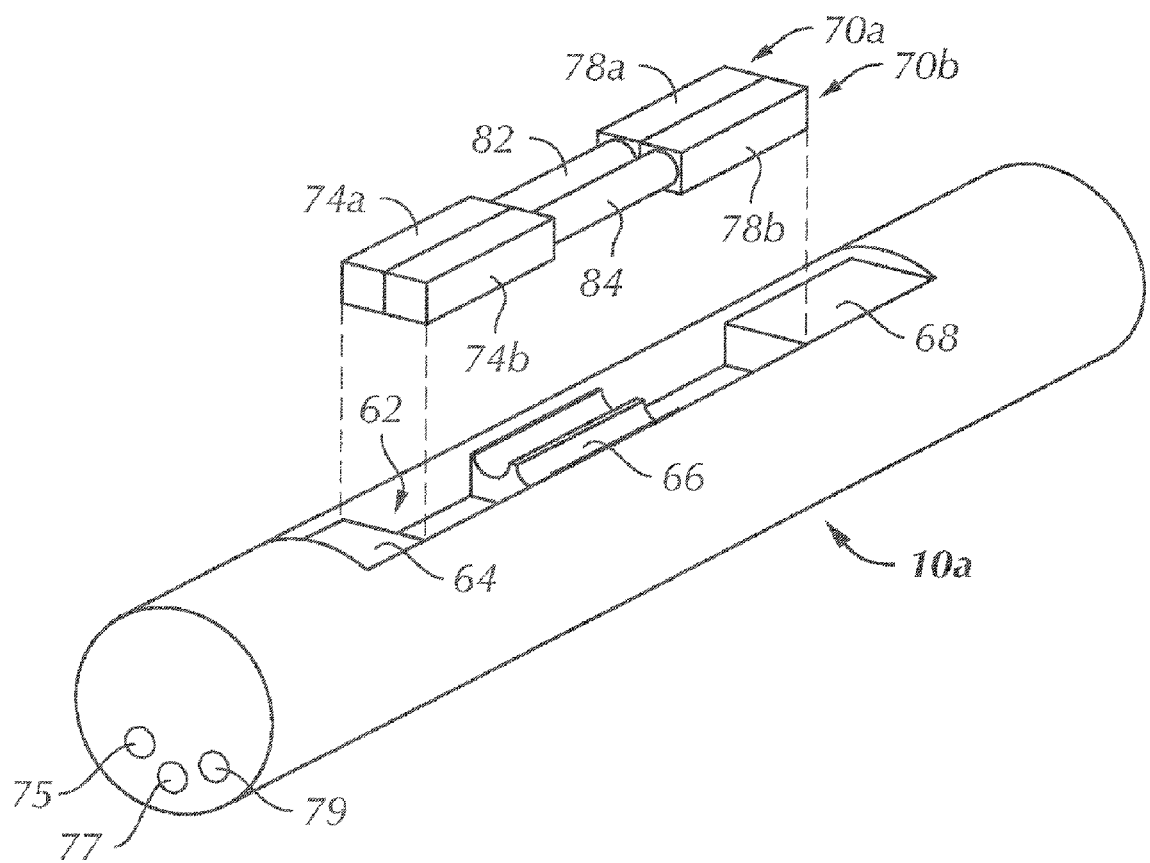
FIG. 2a is a conceptual, exploded perspective view showing a section of the formation tester and dual pressure gauge assemblies that are received by the section.

FIG. 2a is a conceptual, exploded perspective view showing a pressure measurement system disposed in a section 10a of the formation tester 10. The pressure measurement system comprises two pressure gauge assemblies 70a and 70b that are removably disposed within a receptacle or "pocket" 62 in the outer surface of the formation tester section 10a. The tool section 10a can represent any or all of the tool sections 11, 12, 18 20 and 24 discussed previously and illustrated conceptually in FIG. 1.

The pressure gauge assemblies 70a and 70b each comprise a pressure sensing gauges 82 and 84, respectively. The assemblies 70a and 70b and the pressure gauges therein are axially aligned "side-by-side" along the major axis of the tool section 10a. The types of pressure sensing gauges 82 and 84 may be of any type, such as but are not limited to, strain, quartz, sapphire, or any combination of the different types of pressure gauges. The gauges 82 and 84 are electrically connected to assembly electrical connectors 78a and 78b, respectfully, disposed at one end of the pressure gauge assemblies 70a and 70b. The gauges 82 and 84 are hydraulically coupled to assembly hydraulic connectors 74a and 74b, respectively, at the opposite end of the pressure gauge assemblies 70a and 70b. The assembly hydraulic connectors 74a and 74b are configured so that both gauges 82 and 84 are connected in the tool body to the same pressure flow line.

Again referring to FIG. 2a, the pressure gauge assemblies 70a and 70b are removably disposed within the receptacle or "pocket" 62 in the outer surface of the formation tester tool section 10a. When disposed or "side loaded" in the pocket 62, the axially aligned gauges 82 and 84 are positioned in a plane that is essentially normal to the radius of the formation tester tool section 10a. The electrical connectors 78a and 78b connect to a tool electrical connector 68 thereby establishing electrical connection between the gauges 82 and 84 and an electronic section 22 of the formation tester tool 10 (see FIG. 1). In addition, the assembly hydraulic connectors 74a and 78b operationally connect to a tool hydraulic connector 64 thereby establishing pressure connection, via the one or more fluid flow lines (see FIGS. 4 and 5), between the gauges 82 and 84 and a port or probe section 12 of the formation tester tool 10 (see FIG. 1), or to one or more fluid flowbusses 50. One or more fluid flow ports, as illustrated at 79 for the section 10a, align with matching ports in additional sections of the tool 10 thereby establishing one (or more) contiguous fluid flowbus conduits illustrated conceptually in FIG. 1 by the broken line 50. As stated previously, both gauges 82 and 84 are exposed to an area of common pressure, such as fluid pressure originating from the probe or port section 12, thereby providing redundant pressure measurements.

The low mass of the pressure sensing gauges 82 and 84 and the cooperating heat exchange assembly 66 (see FIGS. 3 and 4) allow the pressure gauges to respond rapidly to changing temperatures. The rapid temperature stabilization of the pressure gauge with the well bore temperature reduces operational rig time and ensures accurate pressure readings. Temperature stabilization of the gauges is critical because all pressure sensing gauges are affected by both temperature and pressure simultaneously. Changing pressure gauge temperature causes unstable pressure measurements.

Figure 2B:
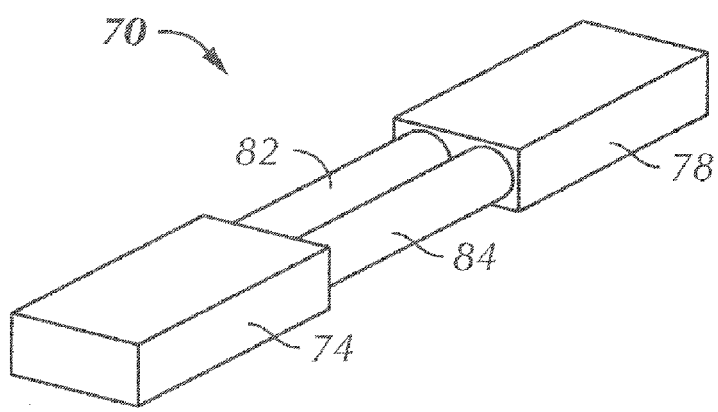
FIG. 2b illustrates a single pressure gauge assembly comprising two axially aligned pressure sensing gauges.

The axial alignment or "side-by-side" gauge geometry as illustrated in FIGS. 2a, 2b and 3 reduces the shut in fluid volumes when compared with an "end-to-end" gauge geometry. As an example, the shut in fluid volume for the side-by-side gauge geometry would be less than one half the corresponding shut in volume that would typically be required for dual "end-to-end" gauge geometries. In addition, the shut in fluid volume is equal for both gauges. In pressure transient analysis (PTA), storage volumes play a large role in the interpretation. The much smaller and equal storage volumes have a large benefit during PTA. In an "end-to-end" gauge geometry both gauges are exposed to different pressures due to the gravity head and fluid type in the flow line. The "side-by-side" geometry exposes both pressure gauges to the exact same pressure negating the requirement to make an adjustment between the gauges that is required in the "end-to-end" geometry. This is especially important as the fluid type required for the correction is not always known.

Figure 3A:
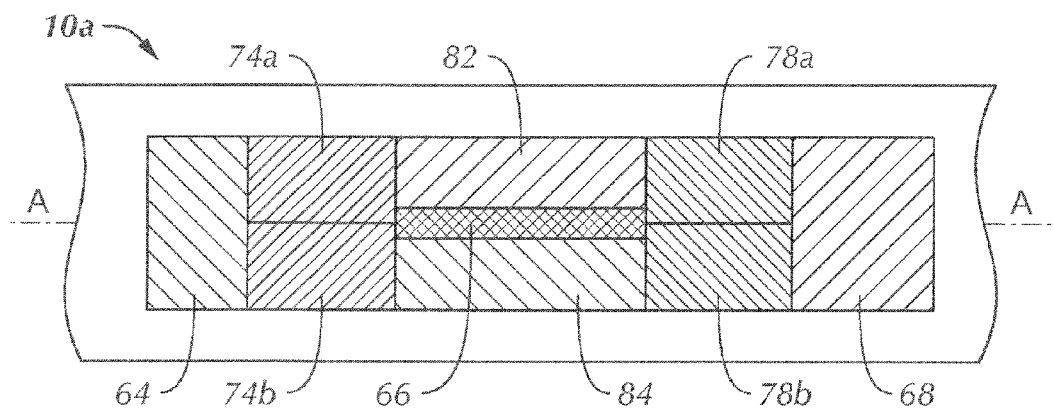
FIG. 3a is a top view of elements of two pressure gauge assemblies disposed in a pocket in the outer surface of the wall of a formation tester section.
Figure 3B:
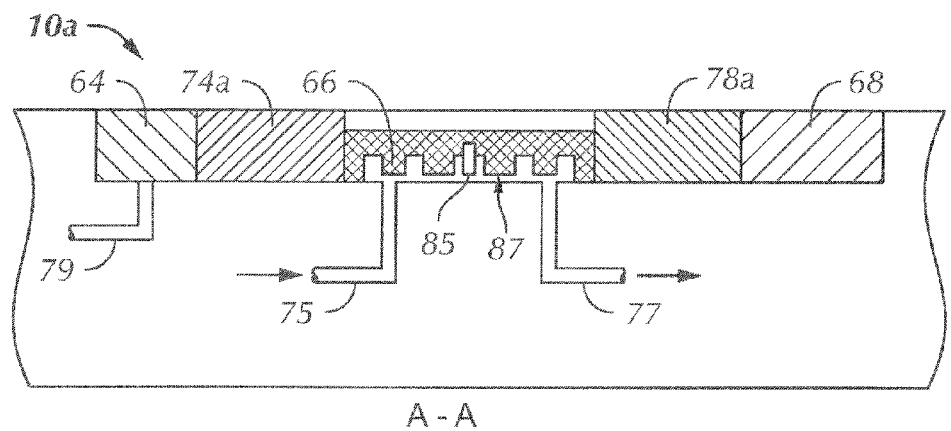
FIG. 3b is a sectional view of the top view shown in FIG. 3a illustrating a heater assembly that is hydraulically or electrically connected.

Referring to FIGS. 3a and 3b along with FIG. 2a, a heater assembly 66 connects to the hydraulic section 24 of the formation tester tool 10 (see FIG. 1). Hydraulic fluid circulates through the heater assembly 66 from the tool hydraulics 24 through the hydraulic flowbusses shown conceptually as a broken line 52 in FIG. 1. One or more fluid flow ports as illustrated at 75 and 77 for the section 10a align with matching ports in additional sections of the tool 10 thereby establishing one or more contiguous hydraulic flowbus conduits illustrated conceptually at 52. The heater assembly 66 disposed in the tool body heats the pressure sensing gauges 82 and 84 thereby rapidly raising the temperature of the pressure gauges. In the embodiment shown, the heater assembly 66 is hydraulic but an electric heater element is not precluded. This methodology rapidly elevates both gauges 82 and 84 to temperatures in a range normally encountered in a borehole environment thereby reducing the time for the pressure gauges to reach thermal equilibrium with the borehole environs. In another embodiment (not shown) the heater assembly can be powered electrically.

Alternately, two pressure sensing gauges 82 and 84 can be disposed and axially aligned within a single pressure gauge assembly, as depicted in FIG. 2b and denoted at 70. In this embodiment, the gauges 82 and 84 are electrically connected to a single assembly electrical connector 78 disposed at one end of the pressure gauge assembly 70. The gauges 82 and 84 are hydraulically coupled to a single assembly hydraulic connector 74 at the opposite end of the pressure gauge assemblies 70. Again, the assembly hydraulic connector 74 is configured so that both gauges 82 and 84 are connected in the tool body to the same pressure flow line.

FIG. 3a is a top view of elements of pressure gauge assemblies 70a and 70b disposed in a pocket 62 (see FIG. 2a) and operationally connected to tool hydraulic and electrical connectors 64 and 66, respectively. The gauges 82 and 84 are thermally coupled to the heater assembly 66.

FIG. 3b is a side sectional view A-A of the top view shown in FIG. 3a. This sectional view shows a beater orifice 85 in the heater assembly 66 through which hydraulic fluid is circulated. Circulating hydraulic fluid enters and exits the heater assembly 66 through the flow lines 75 and 77. The heater assembly 66 thermally contacts the gauges 82 and 84 to provide heating to wellbore temperature. This methodology rapidly raises the temperature of the gauges 82 and 84. More specifically, this methodology rapidly elevates both gauges 82 and 84 to temperatures in a range normally encountered in a borehole environment thereby avoiding excessive time for the pressure gauge assemblies 70a and 70b to reach thermal equilibrium with the borehole environs. Once again, the low masses of the gauges 82 and 84 allow the pressure gauges 82 and 84 to respond to rapid changes on temperatures. In another embodiment (not shown), orifice 85 shown in FIG. 3b would represent conceptually a heater element in an electric heater assembly.

Still referring to FIG. 3b, a fluid flow line 79 is shown connecting the tool hydraulic connector 64 which, through the porting in the tool body, exposes both gauges 82 and 84 to the exact same fluid pressure. It should be noted that during a fluid pressure measurement, the pressure gauge assemblies 70a and 70b are isolated from the contiguous fluid flow bus 50 shown in FIG. 1 using valving arrangements of the type illustrated in previously referenced U.S. patent application Ser. No. 11/626,461.

Figure 4:
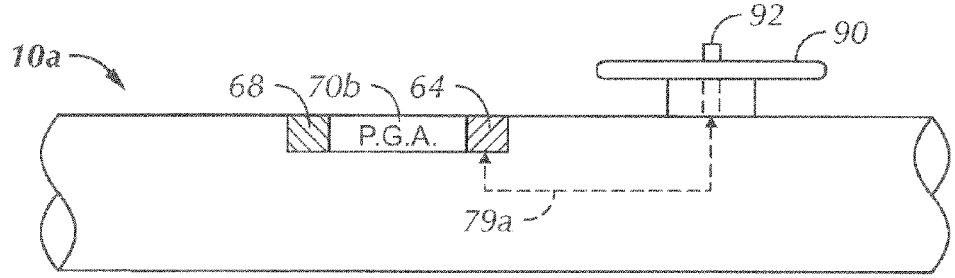
FIG. 4 illustrates conceptually a pressure gauge assembly disposed in a probe tool section.

As mentioned previously, a pressure gauge assembly can be disposed at a variety of positions in a variety of formation tester tool sections to yield redundant pressure measurements. FIG. 4 illustrates conceptually a probe tool section 10a comprising an extendable pad 90 and a protruding probe that penetrates formation material. The probe 92 is hydraulically coupled to both pressure gauge assemblies 70a and 70b via the tool hydraulic connector 64 a fluid flow line 79a. Elements are configured to minimize the length of the flow line 79a. The view depicted in FIG. 4 is from the opposite side of the view shown in FIG. 3b, therefore the pressure gauge assembly 70b is shown. As in previously discussed embodiments, electrical connection is provided to the pressure gauge assembly 70b (and also pressure gauge assembly 70a which is not shown) through the tool electrical connector 68. Electrical connector 68 is, in turn, is electrically connected preferably to the electronics present in each tool section.

Figure 5:
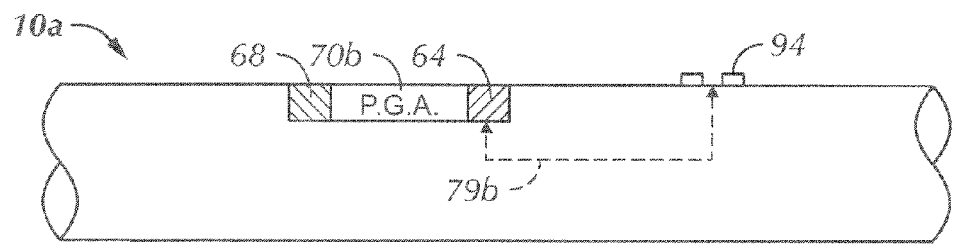
FIG. 5 illustrates conceptually a pressure gauge assembly disposed in a port tool section.

FIG. 5 illustrates conceptually a probe tool section 10a comprising a port 94 that is in hydraulic communication with fluid in the borehole. This borehole fluid can be isolated by one or more packers such as a straddle packer (not shown) controlled by the packer section 11 of the formation tester tool 10. The port 94 is hydraulically coupled to the pressure gauge assemblies 70a and 70b (only assembly 70b is shown) again via the tool hydraulic connector 64 and a fluid flow line 79b. Once again, elements are configured to minimize the length of the flow line 79b. Furthermore, electrical connection is again provided to the pressure gauge assemblies 70a and 70b through the tool electrical connector 68 which, in turn, is electrically connected preferably to the electronics in each tool section. It should be noted that by using packers as an isolation means, borehole fluid pressure measurements can be made in cased as well as uncased or "open" boreholes.

The gauges 82 and 84 are preferably calibrated by exposing the pressure gauge assembly 70a, 70b or 70 to a known pressure at a known ambient temperature as is normal in the industry.

The dual pressure gauges 82 and 84 provide redundant fluid pressure measurements at an area of common pressure in the borehole environs. Any divergence in the two pressure measurements indicates that at least one pressure gauge is malfunctioning. The response from the working pressure gauge can be used to determine fluid pressure thereby avoiding aborting the formation testing operation.

As discussed previously, the each pressure gauge assembly 70a, 70b or 70 is removably disposed in a recession or pocket 62 on the outer surface of the tool section 10a (see FIG. 2a). This side loading feature allows one or more assemblies to be rapidly changed. Due to the fragile nature of high resolution pressure sensing gauges, the gauges can be transported separately in special handling containers and inserted into the formation tester tool 10 immediately prior to testing operations. This is possible as the pressure gauge assemblies 70a, 70b or 70 are accessed from the outer surface of the tool section 10a and can be easily removed and inserted. In addition, the same pressure gauge assemblies 70a, 70b or 70 can be removably disposed sequentially in a plurality of tester tools 10 or tool sections 10a thereby minimizing systematic gauge error in multiple runs or runs in multiple wells. This is especially important within a single well or for a field study of multiple wells.

Pressure values are obtained for the numerous circumstances and conditions discussed above by combining responses of the pressure gauges using a processor and preferably the processor disposed in the previously discussed electronics section 22 (see FIG. 1).

SUMMARY

Preferably two pressure gauge assemblies are used to provide redundant pressure measurements at a given location of the borehole environs. If the preferred two pressure gauge assemblies are used, each assembly comprises a pressure sensing gauge. The pressure gauge assemblies are disposed such that the pressure gauges are axially aligned with parallel major axes. If one pressure gauge assembly is used, two pressure gauges are axially aligned within the assembly. Pressure gauge assemblies are removably disposed within a receptacle or "pocket" in the outer surface of a formation tester tool or formation tester tool section. When disposed or "side loaded" in the pocket, the assembly's axially aligned gauges are positioned in a plane that is essentially normal to the radius of the formation tester tool. The axial alignment or "side-by-side" geometry reduces and equalizes fluid flow line volumes between the gauges as well as eliminating errors between the pressure gauges due to hydrostatic head. Both the volumes are equal and the fluids are identically the same for both gauges. This is important because the fluid properties such as compressibility and viscosity will be the same for these same fluids of equal volume. This, in turn, is important during pressure transient testing when fluid properties such as compressibility effects must be taken into consideration. This is also important when doing pressure, volume, temperature (PVT) testing. All of these features are not possible using axially spaced or "end-to-end" gauge geometry. The exposed geometry of the pressure gauge assemblies allows quick stabilization to wellbore temperature. As well, the exposed geometry in combination with the low mass of the gauges and the cooperating heater assembly allow the pressure gauges to respond to rapid wellbore temperatures changes that are encountered as the tool is moved up and down the well borehole. In addition, the heater assembly can assist raising the pressure gauge temperature to the wellbore temperature rapidly.

Any divergence in pressure measurements between the dual gauges indicates that at least one pressure gauge is malfunctioning. The response of the working gauge can be used to determine fluid pressure thereby avoiding aborting the formation testing operation. The axial alignment or "side-by-side" gauge geometry reduces shut in fluid volumes when compared with an "end-to-end" or axially spaced gauge geometry. The side loading feature of the pressure gauge assembly allows the assembly to be changed with minimal operation down time. Furthermore, the same pressure gauge assembly can be disposed sequentially in a plurality of tester tools thereby minimizing systematic error in multiple run or multiple well testing operations.

While the foregoing disclosure is directed toward the preferred embodiments of the invention, the scope of the invention is defined by the claims, which follow.

What is claimed is:

1. A pressure gauge comprising:
   (a) two axially aligned pressure sensing gauges wherein said pressure sensing gauges are of equal volume and are exposed to an area of common pressure; and
   (b) a pressure gauge assembly comprising an assembly hydraulic connector that cooperates with a said pressure sensing gauge; wherein
   (c) said pressure gauge assembly is removably disposed in a pocket in an outer surface of a formation tester tool section and hydraulically couples to a fluid flow line or to a hydraulic flow line within said formation tester tool section via said assembly hydraulic connector.

2. The gauge of claim 1 wherein said two pressure sensing gauges are disposed in a plane essentially normal to the radius of said formation tool tester section.

3. A system for measuring pressure within a borehole, the system comprising:

(a) two pressure sensing gauges disposed within one or more pressure gauge assemblies, wherein said one or more pressure gauge assemblies each comprise
  (i) a assembly hydraulic connector cooperating with said one or more pressure sensing gauges disposed therein, wherein
  (ii) said one or more pressure gauge assemblies are configured to expose said two pressure sensing gauges therein to said pressure;
(b) a pocket containing a tool hydraulic connector; wherein
  (i) said pocket is disposed on an outer surface of a wall of a formation tester tool section,
  (ii) said one or more pressure gauge assemblies are removably disposed within said pocket such that said two pressure sensing gauges are axially aligned, and
  (iii) said two pressure sensing gauges are disposed in a plane essentially normal to the radius of said formation tool tester section; and
(c) said one or more assembly hydraulic connectors and said tool hydraulic connector cooperate to hydraulically couple said one or more pressure gauge assemblies to a fluid flow line and to a hydraulic flow line within said formation tester tool section.

4. The system of claim 3 further comprising a heater assembly thermally coupled to said pressure sensing gauges wherein:
(a) hydraulic fluid flows from said hydraulic flow line and through said cooperating tool hydraulic connector and said assembly hydraulic connectors and into said heater assembly; and
(b) said heater assembly raises the temperature of said pressure sensing gauges.

5. The system of claim 2 further comprising a processor in which said pressure is determined from responses of said two pressure sensing gauges.

6. The system of claim 2 wherein said formation tester tool section is conveyed within said borehole with a wireline.

7. A method for obtaining a measure of pressure, the method comprising:
(a) simultaneously exposing two axially aligned pressure sensing gauges of equal volume to an area of common pressure;
(b) combining responses of said two pressure sensing gauges to obtain said measure of pressure;
(c) providing a pressure gauge assembly comprising an assembly hydraulic connector with which a said pressure sensing gauge cooperates;
(d) removably disposing said pressure gauge assembly in a pocket in an outer surface of a formation tester tool section; and
(e) hydraulically coupling said pressure gauge assembly to a fluid flow line or to a hydraulic flow line within said formation tester tool section via said assembly hydraulic connector.

8. The method of claim 7 further comprising disposing said two pressure sensing gauges in a plane essentially normal to the radius of said formation tool tester section.

9. A method for measuring pressure within a borehole, the method comprising:
(a) providing two pressure gauge assemblies each comprising
  (i) a pressure sensing gauge of constant volume, and
  (ii) an assembly hydraulic connector cooperating with said pressure sensing gauge;
(b) configuring said pressure gauge assemblies to expose said two pressure sensing gauges therein to said pressure;
(c) providing a pocket containing a tool hydraulic connector wherein said pocket is disposed on an outer surface of a wall of a formation tester tool section;
(d) removably disposing said pressure gauge assemblies within said pocket wherein said pressure sensing gauges therein are
  (i) axially aligned,
  (ii) hydraulically coupled to said formation tester tool section via said assembly hydraulic connectors and said tool hydraulic connector; and
  (iii) disposed in a plane essentially normal to the radius of said formation tool tester section; and
(e) determining said pressure by combining responses of said pressure sensing gauges.

10. The method of claim 9 further comprising:
(a) thermally coupling a heater assembly to said pressure sensing gauges; and
(b) controlling the temperature of said pressure sensing gauges with said heater assembly.

11. The method of claim 9 further comprising conveying said formation tester tool section within said borehole with a wireline.

* * * * *